Dec. 15, 1964  A. J. VOELKER  3,160,960
WHEEL ALIGNMENT TESTING MACHINE
Filed Oct. 2, 1961  5 Sheets-Sheet 1
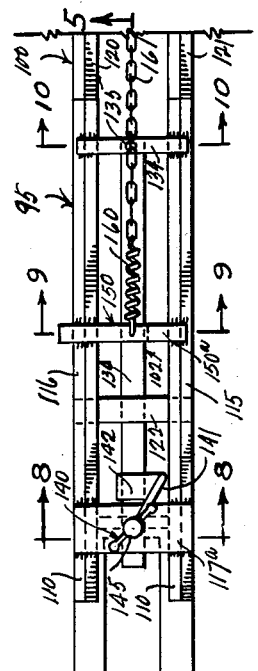
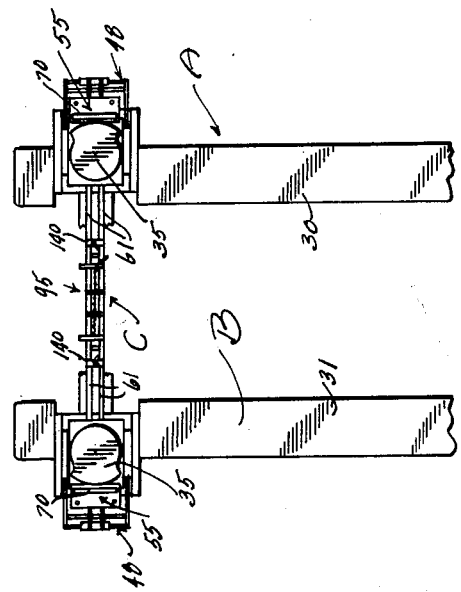
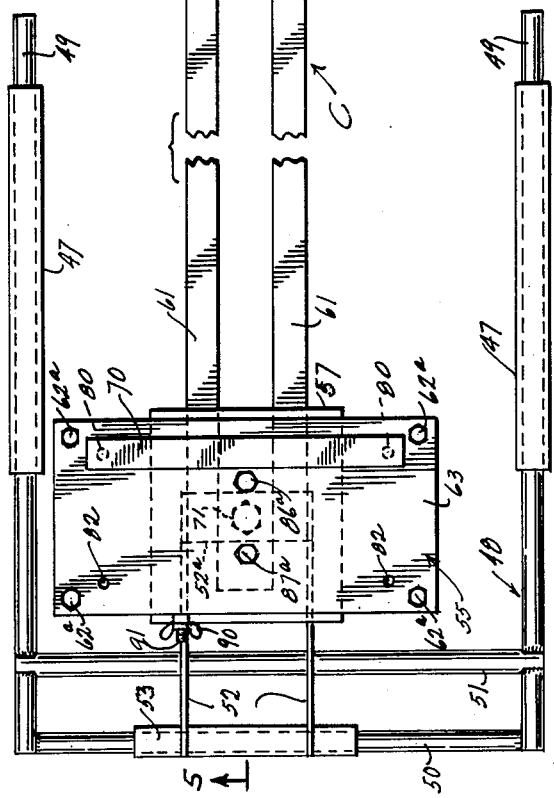
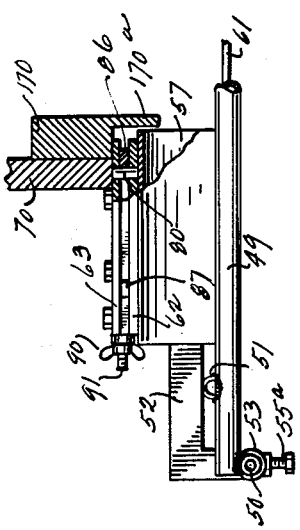
INVENTOR
ANTHONY J. VOELKER
BY
ATTORNEYS

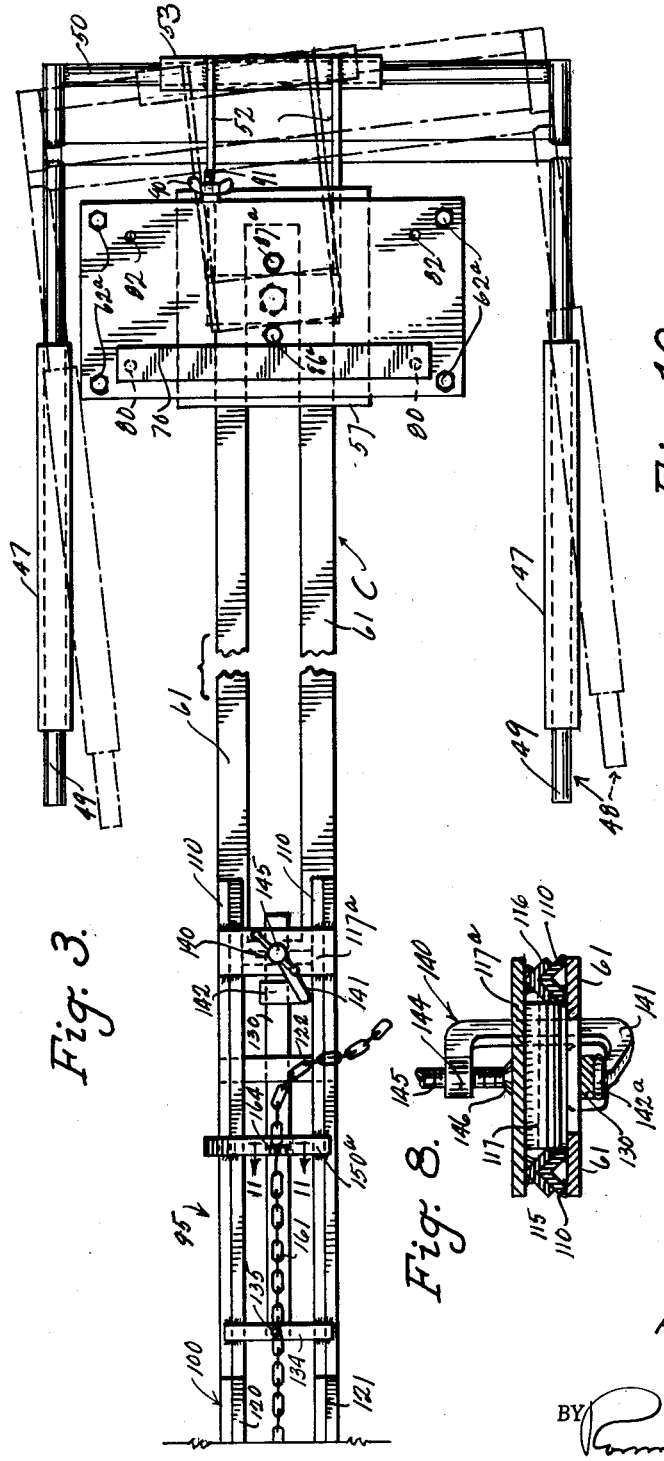

Dec. 15, 1964  A. J. VOELKER  3,160,960
WHEEL ALIGNMENT TESTING MACHINE
Filed Oct. 2, 1961  5 Sheets-Sheet 3

INVENTOR
ANTHONY J. VOELKER
BY
ATTORNEYS

Dec. 15, 1964　　　A. J. VOELKER　　　3,160,960
WHEEL ALIGNMENT TESTING MACHINE
Filed Oct. 2, 1961　　　　　　　　　　　　　　5 Sheets-Sheet 4

INVENTOR
ANTHONY J. VOELKER.

BY Rommel, Allard and Rommel
ATTORNEYS

Dec. 15, 1964  A. J. VOELKER  3,160,960
WHEEL ALIGNMENT TESTING MACHINE
Filed Oct. 2, 1961  5 Sheets-Sheet 5
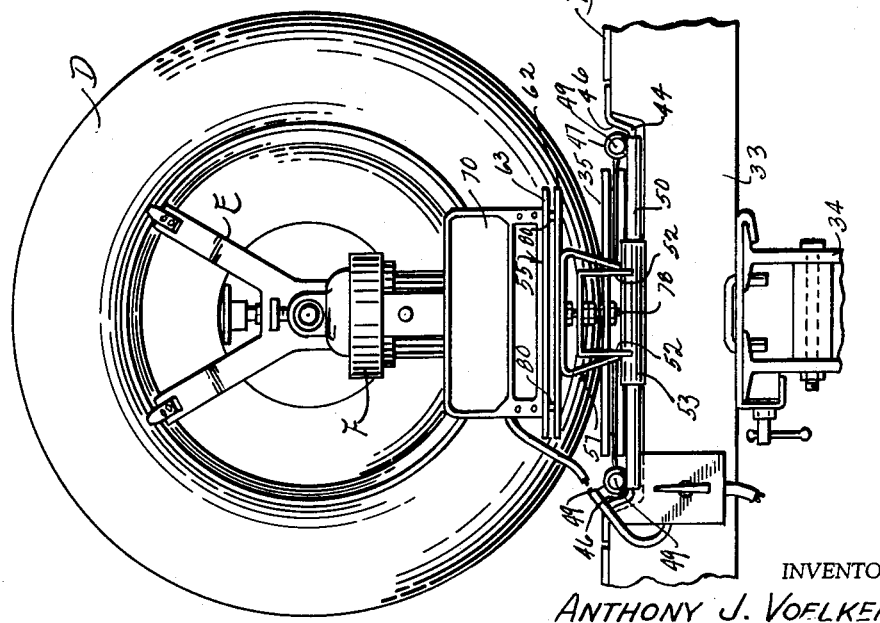
INVENTOR
ANTHONY J. VOELKER
BY
ATTORNEYS

United States Patent Office 3,160,960
Patented Dec. 15, 1964

3,160,960
WHEEL ALIGNMENT TESTING MACHINE
Anthony J. Voelker, Lincoln, Nebr., assignor to 5th Wheel, Inc., Lincoln, Nebr., a corporation of Nebraska
Filed Oct. 2, 1961, Ser. No. 142,284
14 Claims. (Cl. 33—203.12)

This invention relates to improvements in vehicle wheel alignment testing machines.

In conventional wheel alignment testing machines for automotive vehicles there is a considerable problem involved in insuring correct abutment plate parallelism for the right and left abutment plates in order to secure accurate "toe-in" readings. That is true because of inaccuracies in relative mounting and movements of supporting mechanism and movement of the rack in straightening frames. It is therefore a primary object of this invention to provide improved means for supporting abutment plates of testing mechanism to insure absolute parallelism of the right and left abutment plates at all times independent of their relative movement with respect to the rack with which associated and independent of their relative movement towards and away from each other.

A further object of this invention is the provision of an improved mounting frame for the support of abutment plates of testing mechanism, comprising an assembly which will insure precise lineal movement of the plates without lateral turning or other lateral movement whereby independent of the relative movements and spacing of the plates they will be maintained in accurate parallelism at all times, even when the rack, upon which mounted, is in angular variation therewith.

Other objects and advantages of this invention will be apparent during the course of the following detailed description.

In the accompanying drawings, forming a part of this specification, and wherein similar reference characters designate corresponding parts throughout the several views;

FIGURE 1 is a plan view of testing mechanism including runways with which are associated conventional radius plates and the improved means for insuring that the abutment plates will be maintained in precise parallelism at all times, for testing purposes.

FIGURE 2 is a fragmentary plan view of the right side improved means for insuring correct mounting of an abutment plate and its supporting cradle and other associated mechanism.

FIGURE 3 is a fragmentary plan view of details similar to that shown in FIGURE 2, but showing the left portion of the mechanism for insuring the accuracy in paralleling abutment plates.

FIGURES 8, 9 and 10 are transverse cross sectional views taken substantially on the respective lines 8—8; 9—9; 10—10 of FIGURE 2 of the drawings, and more particularly showing the means for connecting the abutment plates and their supporting cradles therefore in parallelism.

FIGURE 18 is an outer end view of the improved means for maintaining abutment plates in parallelism, showing it mounted at the right end of a vehicle supporting rack, in position with respect to a wheel, the "toe-in" of which is to be gauged.

FIGURE 19 is an elevational view, partly in section showing the details of FIGURE 18 in a plane at right angles to FIGURE 18.

FIGURE 20 is a cross sectional view of a cradle showing a slight modification necessary in connection with the testing of very narrow gauged automobiles, where the normal abutment plates cannot be properly spaced, necessitating the use of extender plates.

Figure 4:
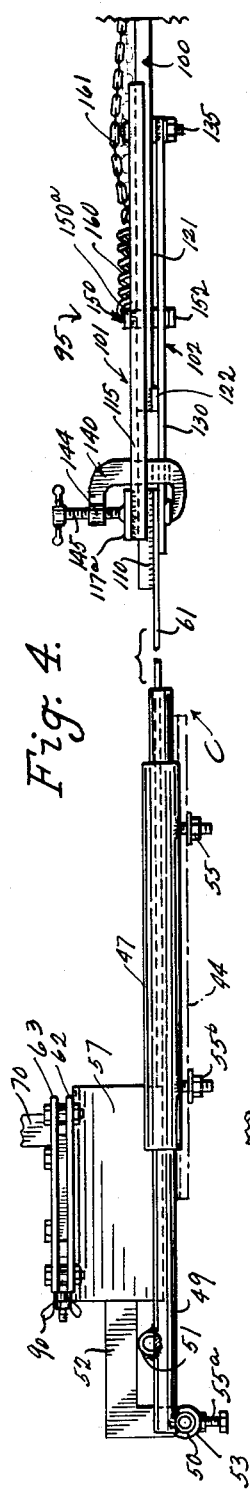
FIGURE 4 is a side elevation of the details shown in FIGURE 2.
Figure 5:
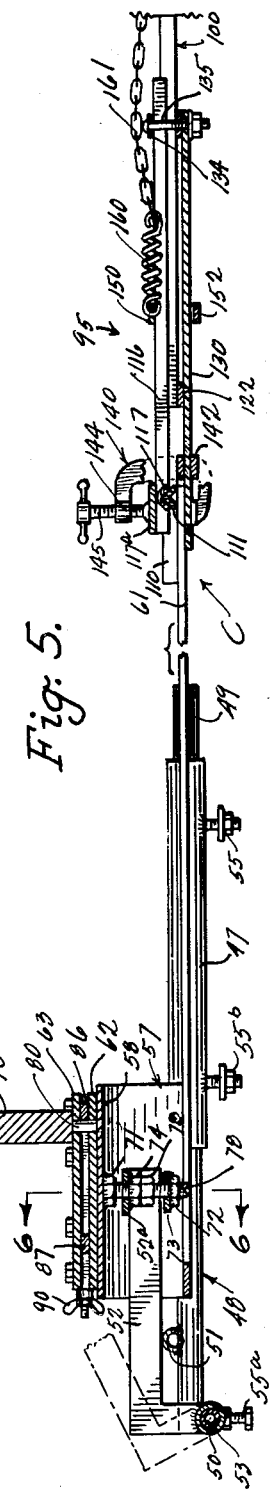
FIGURE 5 is a longitudinal cross sectional view taken substantially along the line 5—5 of FIGURE 2; it being understood that the left hand portion of the invention is constructed similar thereto.

In the drawings, wherein for the purpose of invention is shown a prefered embodiment of the improved wheel alignment testing device, the letter A may generally designate the complete mechanism used for testing vehicle wheels for "toe-in." It consists of a rack frame structure B adapted to support the improved cradle and abutment plate supporting means C for the purpose of insuring accuracy in parallelism of the abutment plates at the right and left of the machine A, and to enable correct lineal adjustment of the plates towards and away from each other, to suit the wheel gauge spacing of different sized automotive vehicles.

The rack frame structure B generally comprises parallel runways 30 and 31, as designated in FIGURE 1 to support the right and left wheels of a vehicle for testing purposes. These runways are generally supported by channel irons 33, such as shown in FIGURES 18 and 19 of the drawings and transverse beams 34 may be additionally provided at the ends of the runways. The channels 33 support radius plates 35 in a construction which is well understood in the art to which this invention relates.

Conventional means for the wheel alignment testing of a wheel D is shown in U.S. Patent 2,765,540, dated October 9, 1956, comprising a wheel clamping assemblage E adapted to support a testing head F. The latter is provided with a testing head abutment plate 40 which is adapted to swing on an arm 41, the angle of swing and the relation of it to the angular position of the central plane of the wheels with respect to the vertical axial plane of the wheels determining the movement of certain indicia, either on an instrument board or remote therefrom through an electronic mechanism well understood in the art for the purpose of measuring "toe-in."

The radius plates each have a drop pan 44, countersunk in the supporting channels 33, as shown in FIGURES 18 and 19, and at each side of the radius plates, that is fore and aft, there are provided narrow spaces 46 wherein are adapted to be mounted certain features of the means C.

More specifically referring to the details of means C, the same comprises at each side of the machine a pair of mounting tubes 47 in spaced parallel relation, which are illustrated in FIGURES 2 and 3 of the drawings, and which are rigidly secured to the drop pan of the rack frame in the spaces 46 above designated by bolts 55b. These mounting tubes 47 are for the purpose of slidably mounting and receiving the right and left yoke structures 48 which are of identical construction, and to which similar reference characters have been applied. Each of these yoke structures 48 preferably comprises a pair of parallel supporting rods 49 the inner ends of which are free and the outer ends of which are connected to a right angled cross bar 50 having its axis slightly below the axes of the tubes 47 and side bars 49. A cross brace and stop bar 51 is also welded or otherwise rigidly secured to the side bars 49 endwise spaced slightly from the cross bar 50 and parallel thereto, for yoke frame reinforcing, and also to act as a horizontal stop for the yoke cradle to be subsequently mentioned.

Each yoke assemblage 48 furthermore includes a lever assemblage and cradle yoke mounting arm structure consisting of a pair of spaced lever arms 52 which at their outer ends have depending portions welded to a sleeve 53; the latter slidably bearing upon the cross member 50 of the yoke above described. These arms 52 at their inner ends are provided with a cross strap 52a welded or otherwise secured thereto, and which strap is used to mount the cradle in position so that it can be angularly adjusted on a vertical axis with respect to the yoke frame structure 48. The sleeve 53 is provided with a pair of clamping screws 55a which may be used to clamp the yoke upon the cross rod 50.

Figure 6:
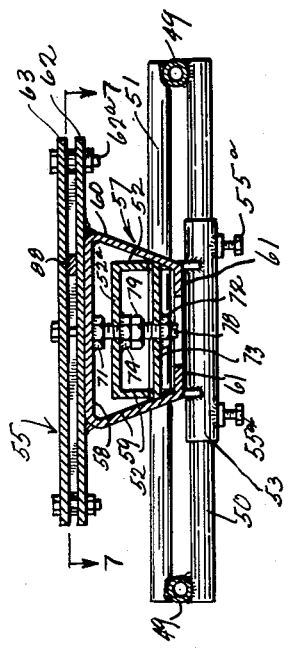
FIGURE 6 is a cross sectional view taken substantially on the line 6—6 of FIGURE 5.
Figure 12:
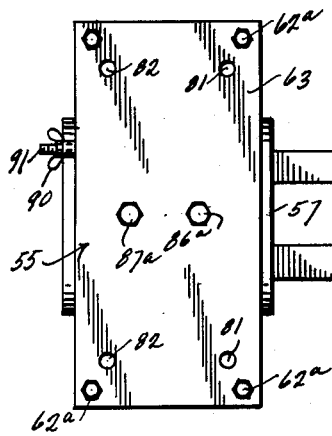
FIGURE 12 is a plan view of right end portion of the invention consisting of an abutment plate supporting member and hitch arms connected to a cradle supported thereby.
Figure 13:
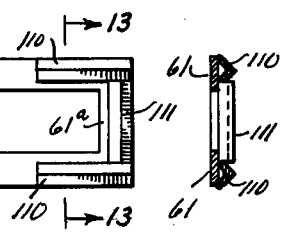
FIGURE 13 is a cross sectional view taken substantially on the line 13—13 of FIGURE 12.

An improved cradle assemblage 55 is provided, shown in FIG. 6. It consists of a bearing housing 57 comprising a top wall 58 and relatively downwardly convergent side walls 59 and 60 which are inturned at their lower ends to provide strap flanges 61. The latter are elongated for the purpose of securement to other details of a hitch mechanism to be subsequently described.

The top wall 58 of the housing 57 has welded thereto a cradle plate 62 which is of rectangular formation, and which supports bolts 62a at the corners thereof. These bolts 62a connect a to pplate 63 of the same size as the bottom plate 62 in spaced relation to the bottom plate 62 by spacer rings 64 on the bolts 62a. This plate arrangement of the cradle 57 is provided for the purpose of receiving an abutment plate 70.

As to the mounting of the cradle structure 55 upon the yoke structure 48, nuts 71 and 72 are welded to the undersides of the wall 58 and a cross piece 73 welded to the walls 59 and 60, as shown in FIG. 6. A nut 74 is welded to the underside of the strap 52a which is connected at the inner ends of the yoke pivot arms 52. These nuts are all in alignment. A threaded pin 78 is engaged in these three nuts. It is provided with a lock nut 79 which locks to the nut 74. This pivots the cradle structure 55 on the nuts 71 and 72. Other pivot structures can be provided but this is an economical and accurate way in which to secure the cradle 57 on a vertical pivot mounting in order that it may be angularly adjusted laterally upon the yoke structure 48.

Figure 7:
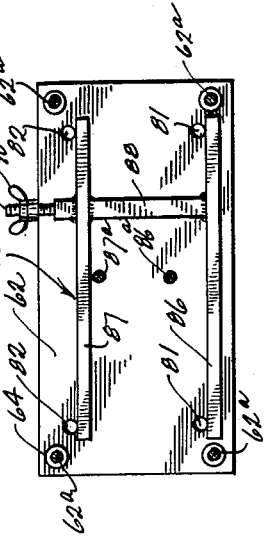
FIGURE 7 is a fragmentary cross sectional view taken substantially on the line 7—7 of FIGURE 6.

The abutment or alignment plates 70 of the machine are each provided with a pair of conventional vertical reduced pin extensions 80 and they are adapted to socket within a pair of openings 81 provided in spaced relation in each of the plates 62 and 63 or in a second more outwardly positioned pair of openings 82 provided in each of said plates 81 (see FIG. 7). It is understood that if the abutment plate 70 is used in the sets of openings 81 it will be for a narrower gauged spacing of the wheels of a vehicle than if the said plates are used in the sets of openings 82. An alignment abutment plate clamping means is provided, consisting of an H-shaped member 85 (see FIG. 7). It has a pair of clamping bars 86 and 87, respectively adapted to engage against the pins 80 which socket in the openings 81 and 82. The bars 86 and 87 are connected by a cross bar 88. This tightener arrangement is manipulated by means of a wing nut 90 threaded on the outer end 91 of a stem which is secured as part of the alignment or abutment plate tightening mechanism 85. The means to clamp the plate 70 upon the cradle will be apparent from the foregoing, since the bars 86 and 87 will clamp against pins 80 in order to hold the plates in the proper sets of openings. Stop pins or bolts 86a and 87a are provided upon the cradle plates 72 and 63 for engagement by the bars 86 and 87 for motion limiting purposes.

The connecting structure between the right and left yokes 48 and right and left cradles 55 consists of a hitch mechanism 95 provided for the purpose of bringing the cradles together so the alignment or abutment plates will be maintained in absolute parallelism and properly spaced to engage with the abutment plates 40 of the testing heads, when the vehicle wheels are in position for testing of "toe-in." This parallelism of the abutment plates will be maintained at all times so long as the hitch mechanism 95 is in connected position, even though the vehicle wheels to be tested have been inaccurately run up on the radius plates or even though the rack of the machine is moved during use in straightening frames.

Figure 14:
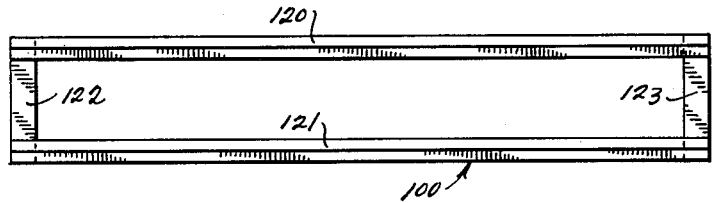
FIGURE 14 is a plan view of a hitch body adapted to be used for the adjustable support of right and left assemblages used as part of the invention.
Figure 15:
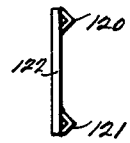
FIGURE 15 is an end elevation of the hitch body of FIGURE 14, more particularly showing the shape of trackways thereon.
Figure 16:
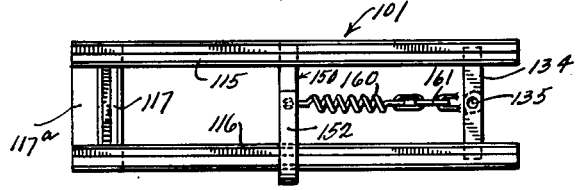
FIGURE 16 is a bottom plan view of a right hand hitch clamp body adapted to be associated with the assemblage of FIGURE 12 and the hitch body of FIGURE 14, and which is adjustable along the hitch body of FIGURE 14 for abutment plate placement.
Figure 17:
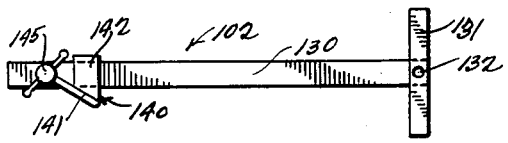
FIGURE 17 is a plan view of a hitch clamp and strap arrangement to lock the right hand hitch clamp body of FIGURE 16 to the assemblage of FIGURE 12.
Figure 11:
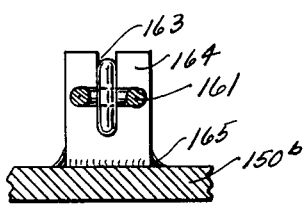
FIGURE 11 is an enlarged cross sectional view taken substantially on the line 11—11 of FIGURE 3, more particularly showing a means for holding a clamping chain in position.

The most essential features of the hitch means by which the cradles are connected for absolute parallelism consists of a true linear adjustment action, without any lateral angling. Also the connecting structure between the cradles must be durable and effective against lateral bending action or lateral play. To that end there has been provided a hitch body 100 shown in FIGS. 14 and 15, upon which is adapted to be linearly slidably mounted right and left hitch clamp bodies 101, one of which is shown in FIG. 16, and also having associated therewith adjustable clamping structures 102 one of which is shown in FIG. 17, adapted to be used in locking the hitch clamp bodies 101 to the hitch bodies 100 and to the rails or arms 61 above described. Each of the yoke structures 48 have the relatively spaced parallel hitch arms 61 which at their inner ends are provided with inverted V-shaped parallel angles 110 welded thereto, the apices of which face upwardly. The ends of the arms 61 have a cross connection 61a and on the upper surface thereof is also welded an inverted V-shaped member 111 with its apex facing upwardly. This structure is used upon both the right and left yokes and comprises part of the hitch mechanism.

The structure of each hitch clamp body 101 comprises a pair of relatively spaced parallel inverted V-shaped rails 115 and 116 connected at one end, spaced from the adjacent ends of the rails, by a strap 117a upon which is welded an inverted V-shaped cross rail 117. The angled rails 115, 116 and 117 are formed of right angled stock material and their sockets are adapted to receive therein the members 110 and 111 of the hitch arms 61 in a manner which is shown in the cross sectional view of FIG. 8. It will be noted that the right and left hitch clamp bodies can be anchored to the arms 61 against longitudinal movement with respect to the same. The socketed sides of the rails 115 and 116 are adapted to rest upon the apex sides of the parallel relatively spaced rails 120 and 121 of the hitch body 100, shown in FIG. 14. These rails 120 and 121 are end connected by cross pieces 122 and 123.

The hitch clamp and strap structure 102 shown in FIG. 17 consists of a central bar or rail 130 having at one end welded or otherwise secured thereto a right angled strap 131 provided with a central opening 132 therein. The hitch clamp bodies 101, are each provided with a welded cross strap 134 centrally provided with a right angled bolt 135, welded thereto, as best shown in FIG. 10. This bolt at its threaded end is adapted to be inserted through the opening 132 of the hitch clamp and strap structure 102 of FIG. 17 and secured therein by a nut 135 in such manner that the rail 130 can pivot on this bolt 135 and can swing laterally thereon. This enables the clamp end to sufficiently clear the interengaging ends of members 100 and 101 in order to enable their relative engagement and disengagement. It will be noted that the cross piece 131 can move relative to the bottom edges of the rails 120 and 121 of the hitch body 100, as shown in FIG. 10.

The hitch clamp and strap 102 is provided with a clamp 140 which includes a frame 141 having a sleeve 142 which is secured thereto and slidable along the rail 130. The clamp 140 has a clamping foot 142$^a$ which is in position to clamp against the rail 130, as shown in FIG. 8 and at its upper end it is provided with an internally screw threaded nut 144 rotatably receiving a clamping screw 145 which has a foot end 146 adapted to clamp against the cross strap 117$^a$ which supports the V-shaped socket providing member 117 above described.

It will be apparent from the foregoing that the clamps 140 are used for the purpose of clamping the right and left hitch clamp bodies 101 in position at the ends of the arms 61 in the relation above-described. They now can be pulled together upon the hitch body 100 for the purpose of accurate relative spacing of the abutment or alignment plates 70, by means of a spring biasing arrangement. This includes a cross member 150, the top rail 150$^a$ of which is welded at 151 to the apex sides of the rails 115 and 116 of the right and left hitch clamp bodies 101. Each member 150 has a short underarm 152 upon which the hitch clamp strap arm 130 rests, as is shown in FIG. 9. To the cross piece 150$^a$ of the right hand unit of FIG. 2 is secured at one end a spring 160. The spring at its other end is secured to a link-type chain 161 which may be engaged in a kerf 163 of an extension 164 which is welded at 165 on the top rail 150$^b$ of a member 150 which is secured on the left side hitch clamp body 101 and which is otherwise of the same shape and form as the member 150 shown in FIG. 9 for the right hand side hitch clamp body.

Use of the improved alignment of the "toe-in" measuring machine will be apparent from the foregoing. Of course the wheels of the vehicle must be in position on the radius plates 35 and the testing heads F in position. The biasing action of the spring 160 will hold the plates 70 against the abutment plate 40 of the testing head F, and the reading of "toe-in" can be taken from the recording instrument.

The structural assemblage of the cradle and abutment plates supporting means C as above described will insure absolute accuracy in paralleling of the abutment plates 70 of the cradle structures, due to the exacting lineal movements of the hitch structure parts under influence of the hitch spring biasing. Through the cradle structure, and the fact that they are mounted for turning on a vertical adjustment axis, the abutment plates may be kept in constant parallelism.

In FIG. 20 is shown an extension abutment plate 170 which is used for narrow gauge vehicles. It rests on plate 63 of the cradle against the usual abutment plate 70 and has a skirt 170$^a$ depending therefrom.

Various changes may be made to the size and arrangement of parts of this invention without departing from the spirit of the invention or scope of the claims.

I claim:

1. In an automotive vehicle wheel aligning machine the combination of a supporting rack having radius plates mounted thereon upon which are adapted to rest the front wheels of a vehicle to be tested for alignment, right and left abutment plates, supporting means for each of the abutment plates, rack frame connected means for each wheel upon which each of the supporting means of the abutment plates is mounted on a vertical axis, and extensible and retractable hitch means connecting the two abutment plate supporting means together for movement of said two abutment plate supporting means towards and away from each other, said extensible and retractable hitch means being constructed and arranged for lineal movement only against any turning or lateral movement whereby the abutment plates of the two supporting means will be maintained in absolute parallelism at all times independent of their spaced relationship.

2. The machine defined in claim 1 in which vehicle automobile wheels are positioned upon said radius plates each having a test head provided with abutment means for engagement with the abutment plates.

3. In a length adjustable elongated frame for the mounting of abutment plates for wheel alignment testing machines, the combination of two supporting members, cradles movably mounted on each of said members on vertical axes, an abutment plate rigidly mounted on each cradle, and longitudinally adjustable means connecting said cradles together for relative spacing against relative lateral or turning movement with respect to each other for maintaining the abutment plates supported on said cradles in absolute parallelism at all times independent of the relative spacing thereof.

4. The structure of claim 3 in which spring biased means connects said cradles together for normal movement towards each other.

5. In combination with a vehicle supporting rack having radius plates mounted thereon for supporting steering wheels of vehicles to be tested for alignment, supporting means mounted upon the rack for movement transversely thereon with respect to the planes of the wheels supported on the radius plates thereof for alignment, said supporting means comprising two supports, one at the outer side of each wheel having connection with the rack for transverse lineal movement, abutment plates, cradles for supporting each abutment plate, means mounting the cradles for vertical axial turning movement upon each of the supporting means first mentioned, and lineally adjustable hitch means connecting said cradles together for movement in parallelism against lateral turning movement whereby the abutment plates of the cradles may be moved in parallelism for spacing with respect to the testing heads of wheels being tested.

6. Testing mechanism as described in claim 5 in which the hitch means includes a spring biasing construction normally resiliently urging the cradles towards each other with their abutment plates in parallelism.

7. In combination with a testing machine vehicle supporting rack adapted to receive thereon the steering wheels of vehicles to be tested for alignment, a pair of supporting members one mounted at each side of the rack for turning movements on vertical axes, an abutment plate mounted on each of said members for use in connection with the testing heads of steering wheels to be tested for toe-in, means mounting said members on the rack so that they can be moved towards and away from each other, and a cross connection between said mounting members constructed and arranged for straight line lineal movement against lateral turning or lateral movement including a resilient means for normally urging said members towards each other.

8. In combination with a testing machine rack for supporting the steering wheels of automotive vehicles having testing heads secured to the outer sides of said steering wheels, yokes lineally slidably mounted on the racks at the outer sides of said wheels, cradles pivotally mounted on vertical axes on each of said yokes for movement with the yokes but in position to turn on vertical axes with respect thereto, means on the cradles for supporting testing head abutment plates, and hitch means connecting said cradles together for straight line movement towards and away from each other against lateral movement whereby the abutment plates on the cradles will be maintained in absolute parallelism at all times regardless of their relative spacing.

9. A testing machine as described in claim 8 in which the cradles are each provided with a lever assemblage mounted upon its yoke structure which will enable the cradles to be bodily swung outwardly.

10. In a machine for testing automotive vehicle steering wheels for alignment, the combination of a rack frame upon which the steering wheels to be tested are placed, members on the rack at the outer sides of each of the wheels to be tested having connections with the rack for sliding movement transversely with respect thereto, lever means having a horizontal axial mounting on each of said members, a cradle for each of said lever means mounted thereon on a vertical axis for turning movement thereon, an abutment plate rigidly mounted on each of said cradles, and hitch means connecting said cradles together to permit them to be lineally moved towards and away from each other against lateral movements whereby to maintain the abutment plates in parallelism at all times.

11. In combination with a rack for supporting automotive vehicle wheels to be tested for toe-in, the combination of slidable members mounted at the sides of the rack for lineal movement transversely upon the rack, a lever pivotally mounted on a horizontal axis on each of said members, a cradle pivotally mounted on a vertical axis on each of said levers the axes being spaced from the pivot axes of the respective levers, abutment plates, means for rigidly mounting the abutment plates on the cradles, and connecting means between the cradles comprising a longitudinal rigid extension on each of the cradles, an elongated trackway, and means detachably connected to said extensions having trackways riding on the elongated trackway whereby to move therealong for the relative spacing of said cradles, the connecting means between the cradles having linear straight line movement only.

12. An alignment machine as described in claim 11 in which spring biasing means connects the longitudinal extensions whereby to yieldably draw said cradles towards each other.

13. Vehicle wheel testing mechanism comprising a pair of horizontal U-shaped yokes each including side attaching bars and a cross connecting bar, a lever means pivotally mounted on each of cross connecting bars for swinging movement thereon, means to clamp the lever means in definite relation on the cross bars, two cradles, means pivotally mounting a cradle on each of the lever means on a vertical turning axis spaced from the respective lever means turning axis, means on each of the cradles for rigidly supporting an abutment plate, said cradles each having an elongated extension at the inner sides thereof each providing relatively spaced rigid trackways for each cradle, an elongated trackway member having spaced trackways thereon upon which the complementary trackways of the cradle extensions are slidably mounted for linear movement only, and means for connecting the cradle attached extensions together including a biasing spring under tension to normally urge the abutment plates in parallelism towards each other.

14. In a device for wheel testing machines the combination of a pair of plates, means connecting said plates together in spaced parallelism said plates having a plurality of sets of relatively spaced openings therein, an abutment plate having pins for selective socketing in one of the sets of openings, clamping means mounted between the plates for movement therebetween for clamping against the pins to hold them firmly in their openings, said clamping means comprising a pair of elongated clamping bars having a rigid cross connection holding them in parallelism, adjustable means connected to the bars and to the plates to enable the transverse movement of the clamping bars against said pins, and means to limit the relative movement of said bars away from the pin receiving openings of the plates.

References Cited by the Examiner
UNITED STATES PATENTS

| | | | |
|---|---|---|---|
| 1,298,090 | 3/19 | Pym et al. | 33—203.21 |
| 1,922,344 | 8/33 | Bagge | 33—203.17 |
| 1,989,680 | 2/35 | Carver et al. | 33—175 |
| 2,556,227 | 6/51 | Shaw | 33—203.17 |
| 2,664,644 | 1/54 | Tyerman | 33—203.2 |
| 2,748,459 | 6/56 | Orr. | |
| 2,765,540 | 10/56 | MacMillan et al. | 33—203.18 |
| 2,972,189 | 2/61 | Holub | 33—203.2 X |

FOREIGN PATENTS

| | | |
|---|---|---|
| 75,642 | 2/19 | Austria. |

ISAAC LISANN, *Primary Examiner.*